(12) United States Patent
Ocepek et al.

(10) Patent No.: US 7,124,197 B2
(45) Date of Patent: Oct. 17, 2006

(54) SECURITY APPARATUS AND METHOD FOR LOCAL AREA NETWORKS

(75) Inventors: Steven R. Ocepek, Pacifica, CA (US); Brian A. Lauer, Pacifica, CA (US); David A. Dziadziola, San Francisco, CA (US)

(73) Assignee: Mirage Networks, Inc., Austin, TX (US)

( * ) Notice: Subject to any disclaimer, the term of this patent is extended or adjusted under 35 U.S.C. 154(b) by 821 days.

(21) Appl. No.: 10/277,765

(22) Filed: Oct. 22, 2002

(65) Prior Publication Data

US 2004/0049586 A1   Mar. 11, 2004

Related U.S. Application Data

(60) Provisional application No. 60/409,736, filed on Sep. 11, 2002.

(51) Int. Cl.
*G06F 15/16*   (2006.01)
*G06F 15/173*   (2006.01)
*G06F 7/04*   (2006.01)

(52) U.S. Cl. .................. 709/232; 709/225; 726/2

(58) Field of Classification Search .................. 726/2; 709/225

See application file for complete search history.

(56) References Cited

U.S. PATENT DOCUMENTS

| | | | |
|---|---|---|---|
| 5,455,953 A | 10/1995 | Russell | |
| 5,974,452 A | 10/1999 | Karapetkov et al. | |
| 6,044,402 A | 3/2000 | Jacobson et al. | |
| 6,202,169 B1* | 3/2001 | Razzaghe-Ashrafi et al. | .. 714/6 |
| 6,282,575 B1 | 8/2001 | Lin et al. | |
| 6,571,290 B1* | 5/2003 | Selgas et al. | 709/228 |
| 6,857,027 B1* | 2/2005 | Lindeborg et al. | 709/239 |
| 2002/0016858 A1* | 2/2002 | Sawada et al. | 709/238 |
| 2002/0194489 A1* | 12/2002 | Almogy et al. | 713/200 |
| 2003/0135758 A1* | 7/2003 | Turner | 713/201 |
| 2004/0022242 A1* | 2/2004 | Bhogal et al. | 370/389 |

* cited by examiner

*Primary Examiner*—John Follansbee
*Assistant Examiner*—Joshua Joo

(57) ABSTRACT

The present invention includes a method and apparatus for controlling data link layer access to protected servers on a computer network by a client device. Address resolution requests broadcast on the network by the client device seeking access to any network device are received and then processed to determine whether the client device is unknown. If the client device is unknown, restriction address resolution replies are transmitted to the protected devices to restrict access by the client device to the protected devices and allow access to an authentication server. The authentication server is monitored to determine if the client device is authorized or unauthorized by the authentication server. If the client device is authorized, access is allowed to the protected devices. If the client device is unauthorized, blocking address resolution replies are transmitted on the computer network to block access by the client device to all other network devices.

36 Claims, 8 Drawing Sheets

| | Source | Destination | Message |
|---|---|---|---|
| 26 — | AAA | FFF | Who has b.b.b.b tell a.a.a.a (AAA) |

| | Source | Destination | Message |
|---|---|---|---|
| 28 — | BBB | AAA | b.b.b.b is at BBB |

Fig 2

| | Source | Destination | Message |
|---|---|---|---|
| 30 — | DDD | FFF | Who has c.c.c.c tell d.d.d.d (DDD) |

Fig 3

| | Source | Destination | Message |
|---|---|---|---|
| 32 — | CCC | $SSS_{1-i}$ | c.c.c.c is at RRR |

Fig 4

| | Source | Destination | Message |
|---|---|---|---|
| 34 — | CCC | FFF | c.c.c.c is at RRR |

Fig 5

| | Source | Destination | Message |
|---|---|---|---|
| 36 — | DDD/ $SSS_{1-i}$ | FFF | $s.s.s.s_{1-i}$ is at $SSS_{1-i}$ |

Fig. 6

| | 154 | 156 | 146 |
|---|---|---|---|
| | ↓ | ↓ | |
| | Protected Server IP | Protected Server MAC | |
| 16 → | $S.S.S.S_1$ | $SSS_1$ | |
| | $S.S.S.S_2$ | $SSS_2$ | |
| | ⋮ | ⋮ | |
| | $S.S.S.S_i$ | $SSS_i$ | |

Fig. 9

| | 158 | 160 | 148 |
|---|---|---|---|
| | ↓ | ↓ | |
| | Restricted Client IP | Restricted Client MAC | |
| | $C.C.C.C_{R1}$ | NULL  162 | |
| 24-R → | $C.C.C.C_{R2}$ | $CCC_{R2}$ | |
| | ⋮ | ⋮ | |
| | $C.C.C.C_{Rj}$ | $CCC_{Rj}$ | |

Fig. 10.

| | 164 | 166 | 150 |
|---|---|---|---|
| | ↓ | ↓ | |
| | Allowed Client IP | Allowed Client MAC | |
| | $C.C.C.C_{A1}$ | $CCC_{A1}$ | |
| 24-A → | $C.C.C.C_{A2}$ | $CCC_{A2}$ | |
| | ⋮ | ⋮ | |
| | $C.C.C.C_{Ak}$ | $CCC_{Ak}$ | |

Fig. 11

| | 168 | 170 | 152 |
|---|---|---|---|
| | ↓ | ↓ | |
| | Blocked Client IP | Blocked Client MAC | |
| | $C.C.C.C_{B1}$ | $CCC_{B1}$ | |
| 24-B → | $C.C.C.C_{B2}$ | $CCC_{B2}$ | |
| | ⋮ | ⋮ | |
| | $C.C.C.C_{Bl}$ | $CCC_{Bl}$ | |

Fig. 12

SECURITY APPARATUS AND METHOD FOR LOCAL AREA NETWORKS

FIELD OF THE INVENTION

The present invention relates generally to security in a local area network, and more specifically, to the use of security device to control access to the sensitive components of the local area network at the data link layer.

BACKGROUND OF THE INVENTION

With the introduction of low-cost wireless networking technologies, companies are now more vulnerable to intrusion than ever before. Local area networks (LANs) can become compromised from inside the building by misguided employees installing unauthorized access points, malicious hackers hundreds of yards (up to several miles) away, or ordinary people using the company's resources for free Internet access. The nature and proliferation of wireless networking has opened holes behind corporate and consumer security lines by allowing people to view, without detection, and control network traffic at the lowest layer (layer 2/data link layer).

Wireless network equipment was initially made for consumers and therefore was designed to be cheap and easy to use while security was sacrificed for these features. Given the price point and ease of installation, wireless network's adoption into the corporate environment quickly spread. However, this also made it relatively cheap for anyone, employee or not, to add access points to the LAN. Since these devices are bridges (no routing is involved) restricting users can be difficult. Similarly, their lack of IP addresses makes access points hard to notice from an administrative view.

Another issue exacerbating the problem of wireless networking is that access points are Ethernet devices. The nature of the Ethernet standards, specifically address resolution protocol (ARP), is completely insecure and trusting to all commands. This allows anyone with a connection to an access point to perform man-in-the-middle attacks on anyone else in the same segment, wireless or not.

Adding to the problem of foreign hardware in the corporate environment and the trusting nature of ARP is the fact that as long as the range of both emitting and receiving equipment touch, a connection is made. This results in possible intrusion from miles away.

Organizations that do not use wireless LAN devices are also susceptible to the same dangers. It only takes one (perhaps well meaning) employee to compromise LAN security. For example, that employee might consider having a meeting in another office that does not have LAN connectivity. It then becomes apparent that by bringing their personal wireless access point from home, they could solve this problem. With the connection of that consumer wireless LAN device, the corporate LAN is now available outside of the building. In even worse cases, someone with the intent to harm the organization could hide an unknown wireless access point in the building. This is very feasible, since some access points are no larger than a paperback novel. LANs can become compromised from inside the building by misguided employees installing unauthorized access points, malicious hackers hundreds of yards (up to several miles) away, or ordinary people using the company's resources for free Internet access.

Current strategies to securing the LAN include Wired Equivalent Protection (WEP), multiple Virtual Private Networks (VPNs), or Distributed Name Address Translation (DNAT).

In cases where an organization proactively uses wireless LAN products, encrypting the wireless link presents obstacles. The current method for wireless LAN data security is called WEP, which uses an algorithm called RC4. Recently a group of engineers found a weakness in the RC4 keying algorithm, and published a paper detailing this weakness entitled, "Weaknesses in the Key Scheduling Algorithm of RC4" (Scott Fluhrer, Itsik Mantin, and Adi Shamir, Cisco Systems and The Weizmann Institute, 2001). Since this discovery, several programs have surfaced which allow hackers to take advantage of this security flaw and decrypt WEP frames. Once the key has been obtained, wireless devices often allow access to the wired LAN, which in turn gives an intruder the chance to launch attacks against internal servers, or other sites via the organization's Internet connection.

Because the security built into wireless devices has now been compromised, there is a need to augment wireless LANs with security that is more powerful. One approach is to re-engineer or upgrade WEP so that it accounts for the current security flaws. This will likely require the replacement of 802.11 chipsets currently in use. The cost involved with this plan will be considerable, since both wireless cards and access points will have to be repurchased. Because this solution is accomplished through the use of hardware, another consideration must be the possibility of another security exploit in the new encryption. If there were to be another exploit, it would bring wireless LAN security back to the present condition. Most importantly, however, is the fact that 802.11 security does not address the threat of unauthorized (rogue) access points.

Other approaches involve the use of VPNs. These devices create an encrypted tunnel between themselves and their clients. In the case of a wireless LAN, a properly installed VPN would be installed directly behind a wireless access point. If multiple access points are used in different locations of the LAN, multiple VPNs must be purchased, and placed behind each access point. The common type of VPN installation is much less secure. In most cases, the VPN is installed into the wired LAN without regard to the access point. In this scenario, the VPN acts as a peer to the access point, making its use optional. This means that no VPN authentication is required to access the wired LAN through the wireless access point.

Yet another approach focuses on the use of Distributed Name Address Translation, or DNAT. This method creates a one-to-one association between multiple usable IP addresses and one client-side address. This allows the user to roam throughout the organization, but requires the configuration of another subnet space. This method is more focused on ease-of-use, and authentication appears to be susceptible to common LAN attacks such as man-in-the-middle.

In a network optimally configured for security purposes, the network is divided into trusted and distrusted segments. For example, a locked server room could be considered a trusted segment, while other portions of the LAN could be potentially distrusted. This allows for the placement of gatekeepers physically between the trusted and distrusted segments to ensure that all devices on distrusted segments are authenticated before access is permitted to the trusted segments. This architecture prevents access to the internal LAN, as well as the use of unauthorized or "rogue" access points.

However, in large corporate networks there is widespread implementation of flat network topologies. Flat networks are networks in which every device is connected to switches and there is no limitation on who can connect to the LAN. Networks with flat topologies are devoid of trusted and distrusted physical segments. In such a topology, there is no physical location where an in-line security device can be placed to secure sensitive components, such as data servers and e-mail servers. Organizations that use this form of networking are extremely resistant to change. Placing devices in-line with network traffic is extremely difficult and usually results in resistance from system administrators.

One example of a device for blocking unwanted connections within a larger network is the network connection blocker (NCB) disclosed in U.S. Pat. No. 6,044,402 issued to Jacobson et al. The NCB is a device located proximate to the gateway of a protected subnet in order to passively monitor connections between the subnet and the rest of the network. Unwanted connections are actively blocked by the NCB. In order to block connections, the NCB generates connection packets in accordance with the network protocol suite to cause closure of the detected unwanted connections and transmitting the connection packets to the corresponding host computers within the protected subnet. The NCB operates on the network IP layer (layer 3) in order to monitor and close TCP connections. This allows the NCB to work across subnets. However, by operating on the network IP layer, the NCB is ineffective against data link layer attacks.

The present invention avoids the complexity and cost of these other LAN security approaches, while meeting the needs of flat topology networks.

SUMMARY OF THE INVENTION

The present invention includes a method and apparatus for controlling data link layer access to protected servers on a computer network by a client device. Address resolution requests broadcast on the network by the client device seeking access to any network device are received and then processed to determine whether the client device is unknown. If the client device is unknown, restriction address resolution replies are transmitted to the protected devices to restrict access by the client device to the protected devices and allow access to an authentication server. The authentication server is monitored to determine if the client device is authorized or unauthorized by the authentication server. If the client device is authorized, access is allowed to the protected devices. If the client device is unauthorized, blocking address resolution replies are transmitted on the computer network to block access by the client device to all other network devices.

The present invention has other objects and advantages which are set forth in the description of the Detailed Description of the Invention. The features and advantages described in the specification, however, are not all inclusive, and particularly, many additional features and advantages will be apparent to one of ordinary skill in the art in view of the drawings and specification herein.

BRIEF DESCRIPTION OF THE DRAWINGS

FIG. 2 depicts the composition of a standard ARP request and reply.

FIG. 3 depicts the composition of resolution ARP requests.

FIG. 4 depicts the composition of restriction ARP replies.

FIG. 5 depicts the composition of blocking ARP replies.

FIG. 6 depicts the composition of correction ARP requests.

FIG. 9 depicts the composition of the protected server list.

FIG. 10 depicts the composition of the restricted client list.

FIG. 11 depicts the composition of the allowed client list.

FIG. 12 depicts the composition of the blocked client list.

DETAILED DESCRIPTION

Overview

The present invention addresses the three major security problems facing wireless LANs today: 1) access to the internal LAN through the access point, 2) unauthorized wireless access points within the organization, and 3) open nature of flat topologies.

The present invention is flexible enough to allow quick deployment, extremely scalable, and still very secure. It subverts many common attacks by blocking unauthorized users on the lowest layer possible. Additionally, the present invention secures flat topology networks without reconfiguration of the network to accommodate in-line security devices.

Figure 1:
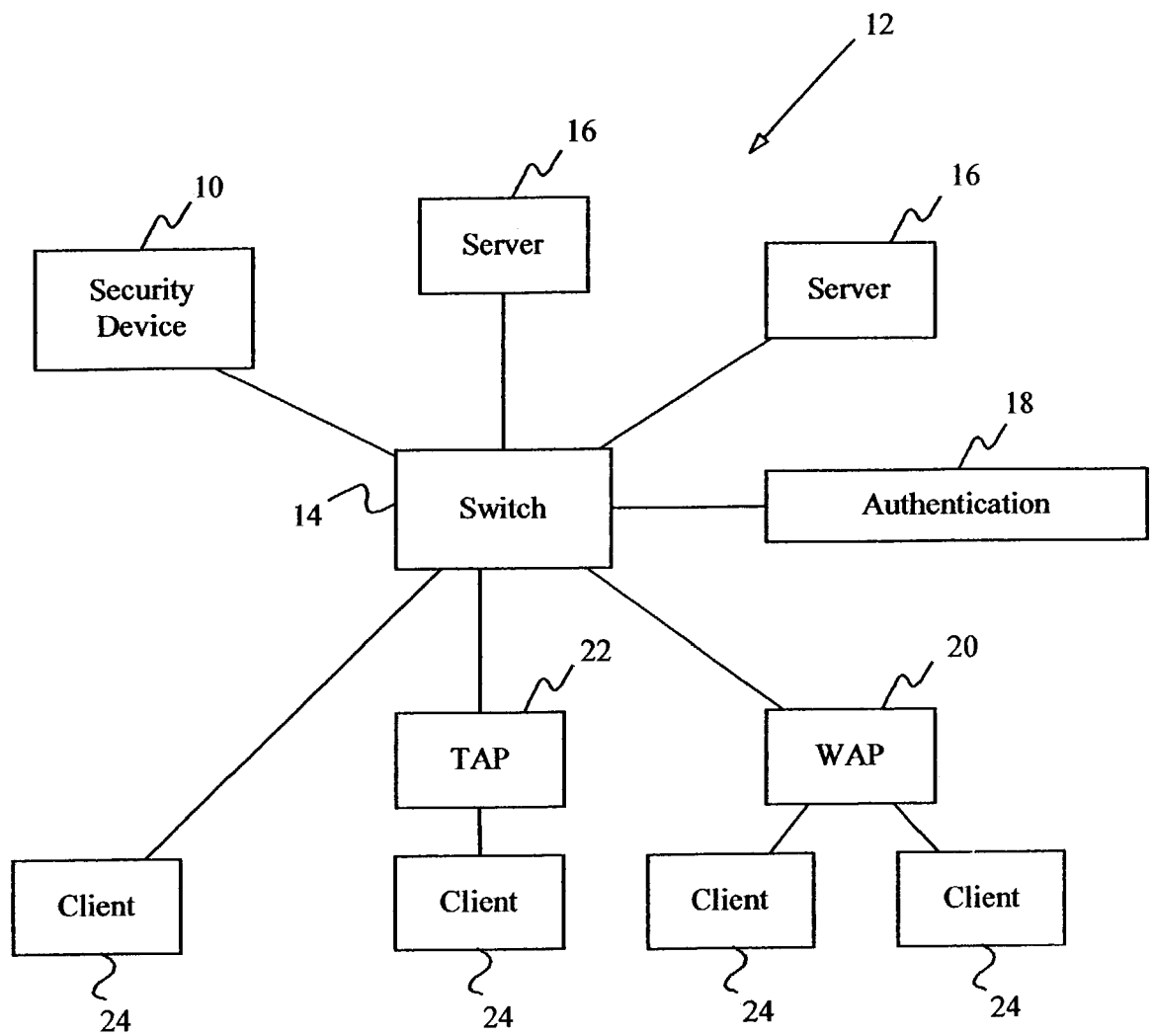
FIG. 1 is a block diagram of the system of the best mode of the present invention in relationship to a simplified LAN environment with a flat topology.

As depicted in FIG. 1, access security is provided through the use of a security device 10 coupled to a local area network 12 as a peer on network switch 14 in order to control access to protected servers 16 (such as data servers, Internet servers, email servers and the like). Typically, a local area network comprises a multitude of interconnected switches and hubs arranged such that any network device is capable of communicating with any other network device in the local area network. FIG. 1 presents a local area network with only a single switch for the sake of simplicity. In TCP/IP type networks, the local area network usually encompasses a single subnet. Security device 10 is capable of controlling access in the data link layer for a single subnet. In order to control multiple subnets, a security device 10 is connected as a peer in each subnet.

Security device 10 is in a peer-to-peer relationship with all network devices including protected servers 16, authentication server 18, wireless access points 20, and client devices 24. Client devices 24 connect to network 12 in a variety of ways, such as via a wireless access point 20, telephone access point ("phone home") device 22, or direct-wired connection. Regardless of whether the connection is wired or wireless, client devices 24 only have authentication server 18 guarding access to protected servers 16. Moreover, client devices 24, such as those connected via wireless access points 20, have access to all broadcast traffic being passed to and from other devices connected to the same local area network, which facilitates the launch of data link layer attacks against network 12. This is the nature of networks with flat topologies. There is no physical segmentation between client devices 24 and protected servers 16.

Security device 10 is preferably implemented in the form of software executed in a dedicated server, such as a Sun Microsystems Sun Fire V100 Server, but any network enabled computer with sufficient memory and processing resources will suffice.

An important aspect of this system is that it does not add substantial networking overhead. Though a security device is added to network 12, no changes have been made from a network-addressing standpoint. All devices are still on the same network, they are simply screened and if necessary blocked out by security device 10.

Security device 10 passively monitors the data link layer for new client devices 24. Once new users are detected, security device 10 actively prevents access to protected servers 16 thus restricting client devices 24 to authentication server 18 (as well as other client devices and any unprotected servers). If a client device 24 and its associated user are then authenticated (i.e., successfully authenticated by authentication server 18), the data link layer restriction imposed by security device 10 is removed. Security device 10 then passively monitors the authenticated client device 24 to determine when the authenticated client device 24 leaves network 12 so that the client device 24 will be treated as a new client device upon their return to network 12. If a client device 24 is not successfully authenticated, security device 10 actively prevents at the data link layer access to network 12 and may disable the rogue client device 24 if it is wireless.

By way of background, the three lowest layers of a network are: 1) physical, 2) data link (e.g., MAC in a TCP/IP network), and 3) network layer (e.g., IP in a TCP/IP network). At the network layer, data is transferred in packets. Each packet comprises a number of frames. In the data link layer (the environment to which the preferred embodiment is applied), each frame contains a destination MAC address, source MAC address, and data. Ultimately, the IP addresses are translated into MAC addresses for routing of the frame.

Address Resolution Protocol (ARP) is a protocol for mapping an Internet Protocol address (IP address) to a physical device (i.e., hardware) address that is recognized in the local network. The physical device address is also known as a Media Access Control (MAC) address. Each computer network interface card is allocated a globally unique 6-byte address when the factory manufactures the card (stored in a PROM). This is the normal source address used by an interface. A computer sends all frames, which it creates with its own hardware source address, and receives all frames that match its hardware address or the broadcast address.

A table, usually called the ARP cache, is used to maintain a correlation between each IP address and its corresponding MAC address. ARP provides the protocol rules for making this correlation and providing address conversion in both directions. When a client seeks access to a server, an ARP program looks in the ARP cache and, if it finds the address, provides it so that the packet can be converted to the right packet length and format and sent to the server. If no entry is found for the IP address, the ARP program broadcasts an ARP request 26 in a special format (as depicted in FIG. 2) to all the machines on the LAN to see if one machine knows that it has that IP address associated with it.

As shown in FIG. 2, the source MAC address is AAA to specify the physical address of the source device seeking access, the destination MAC address is FFF (i.e., the Ethernet broadcast address) to specify all devices as the destination for ARP request 26, and a message of "who has b.b.b.b, tell a.a.a.a (AAA)." The message represents a request by the source device (IP of a.a.a.a and MAC of AAA) for the MAC address of the target device (IP of b.b.b.b). Since ARP request 26 is broadcast, all devices in the same collision domain (LAN) receive ARP request 26. This ensures that if the target device is connected to the network, it will receive a copy of ARP request 26. Only the targeted device responds. The other devices discard the packet silently.

The target device forms and unicasts an ARP reply 28 as shown in FIG. 2. ARP reply 28 contains a source MAC address of BBB, destination MAC address of AAA, and the message "b.b.b.b is at BBB." The message indicates to the source device that the target device has a MAC address of BBB. Now that the source device has the MAC address of the target device, data frames can be readily sent to the target device.

Returning to FIG. 1, any device with access to the wire (either by wired or wireless connection) can inject frames onto the wire. Thus, when a "who has" request is transmitted by a client device 24 on network 12, there is no way of knowing whether client device 24 is legitimate or not.

The present invention is focused upon data link layer communications. More specifically, the preferred embodiment of the present invention controls access based upon ARP requests. System device 10 listens for "who has" ARP requests from client devices 24 attempting to connect to any device on network 12. Upon detection of an unknown client, client device 24 is then allowed to communicate with authentication server 18 although access to protected servers 16 is restricted. System device 10 monitors the authentication process. If the user is authentic, device 10 removes the restriction and allows access by not blocking the access to protected servers 16. However, the access by the authentic user is monitored. If user disconnects from the network, device 10 treats the computer as an unknown computer for future access. If the user is not authentic, the user is labeled as a rogue and access is actively blocked. The process is independent of the type of access point, switch, or hub employed.

Additionally, security device 10 continually performs a corrective process to update all client devices 24 with correct MAC addresses of protected servers 16. This helps prevent many data link layer attacks on network 12.

Security device 10 generates and transmits specially formatted ARP requests and replies, as depicted in FIGS. 3–6, in order to control the data link layer. MAC addresses are represented as three capital letters and IP addresses are represented as four lower case letters, for the sake of simplicity in the present specification. A complete MAC address has twelve alphanumeric characters with the format XX:XX:XX:XX:XX:XX. A complete IP address has four numbers with the format xxx.xxx.xxx.xxx, where xxx is between 0 and 255. For ease of reference in the figures, CCC and c.c.c.c are the shorthand addresses for client devices 24, SSS1-$i$ and s.s.s.s1-$i$ are the shorthand address for protected servers 16-1 to 16-$i$, DDD and d.d.d.d are the shorthand addresses for a decoy device that is not in use on network 12, RRR and r.r.r.r are the shorthand for random, iteratively changing dead addresses, and FFF is the shorthand MAC address for a broadcast to all devices. The decoy address corresponds to a MAC address not present on network 12 but known to security device 10. The random dead MAC addresses are contained in a pre-loaded list in security device 10 and are known to not correspond to any device on network 12.

FIG. 3 depicts a resolution ARP request 30, which is a "who has" request directed at specified client devices 24. The decoy MAC address is used as the source MAC address and as the "tell" address in the message in order to mask the identity (i.e., MAC address) of security device 10. Resolution ARP request 30 is broadcast to all devices.

As shown in FIG. 4, restriction ARP replies 32 contain a destination address corresponding to a protected server 16, a source address corresponding to the restricted client device 24-R, and a random dead MAC address as the "is at" address. A restriction ARP reply 32 is sent to each protected server 16 with a ever changing random dead MAC address from the pre-loaded list. The random dead MAC address prevents protected servers 16 from making a connection with restricted client devices 24-R, since the random dead MAC address will differ from the actual MAC address of restricted client devices 24-R. Since the random MAC address changes with each restriction ARP reply 32, hackers are prevented from changing the MAC address in their rogue client device to match the random MAC addresses.

As depicted in FIG. 5, blocking ARP replies 34 are broadcast to all devices on network 12 where the MAC address identified in the "is at" message is a random dead MAC address like that in restriction ARP replies 32. The target MAC address does not lead to an actual device but the MAC address is known to the system such that the MAC address will not correspond to the hacker or any other device connected to network 12.

Additionally, the source MAC address in blocking ARP replies 34 is the MAC address of blocked client device 24-B. The construct serves as an active attack against wireless, blocked client devices 24-B. When a wireless network interface card receives a frame with source MAC address corresponding to its own MAC address, the card will intermittently cycle off and on. As a result, the wireless network card of blocked client device 24-B will be disabled. Most wired network cards are not affected by such an attack, but wired devices are still denied access.

The composition of a correction ARP reply 36 is depicted in FIG. 6. A correction ARP reply is generated for each protected server 16 and broadcast to all devices. The message contains the correct "is at" for each protected server 16. The source MAC address is dependent upon the operating system and hardware of protected servers 16. If the network interface cards used by protected servers 16 are older models, the network interface cards might be adversely affected if they receive an ARP reply with their own MAC address as the source MAC address. In this case, the decoy MAC address is used. If the protected servers 16 contain a newer operating system that ignores ARP replies when the source MAC address and "is at" MAC address do not match, the actual MAC addresses of protected servers 16 are used as the source MAC address. Protected servers 16 with newer operating systems are unlikely to have aging network interface cards.

Security Device Configuration

Figure 7:
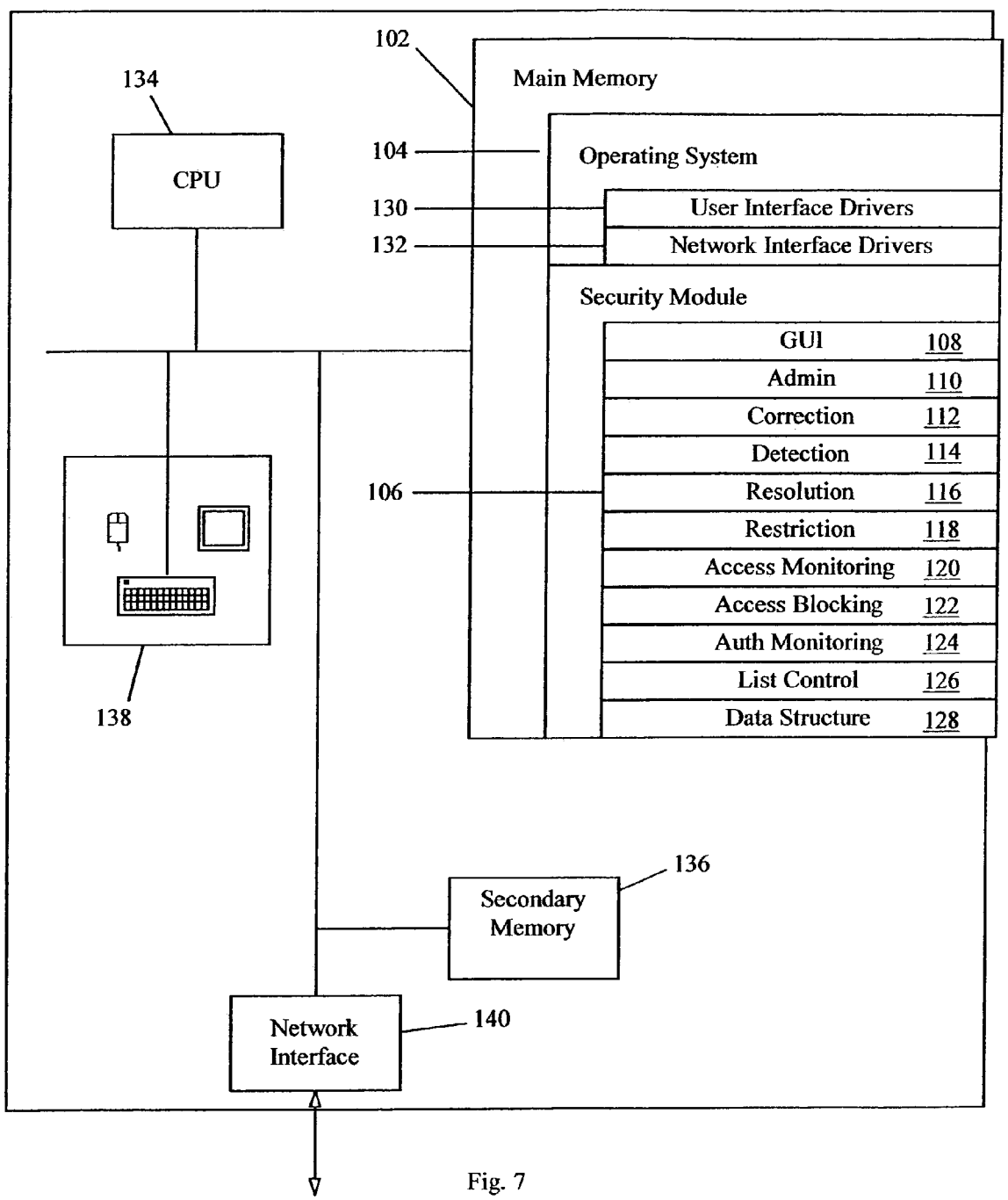
FIG. 7 is a block diagram of the core components of the security device.

The configuration of security device 10 is shown in FIG. 7. Security device 10 comprises a computer 100 that includes main memory 102 for storing an operating system 104 and security module 106. Security module 106 comprises a set of routines including graphical user interface (GUI) 108, administration routine 110, address correction routine 112, address detection routine 114, address resolution routine 116, access restriction routine 118, access monitoring routine 120, access blocking routine 122, authentication monitoring routine 124, and list control 126. Security module 10 also comprises a security data structure 128, which is used to determine which devices on network 10 are protected servers 16 and the access status (restrict, allow or block) of client devices 24. Operating system 104, comprising user interface drivers 130 and network interface driver 132, controls and coordinates running of the routines of security module 106.

Operating system 104 and the routines of security module 106 are run on CPU 134 of security device 10 and may be loaded from secondary memory 136. User interface 138 of security device 10 may be used by a system administrator in conjunction with GUI 108, administration routine 110, and user interface drivers of operating system 130 to configure security device 10 and control its operation. Network interface 140 (such as a network interface card or the like) of security device 10 in conjunction with network interface driver 132 provides an interface for transmitting and receiving address resolution requests and replies to and from network 12.

Security Module Configuration

Figure 8:
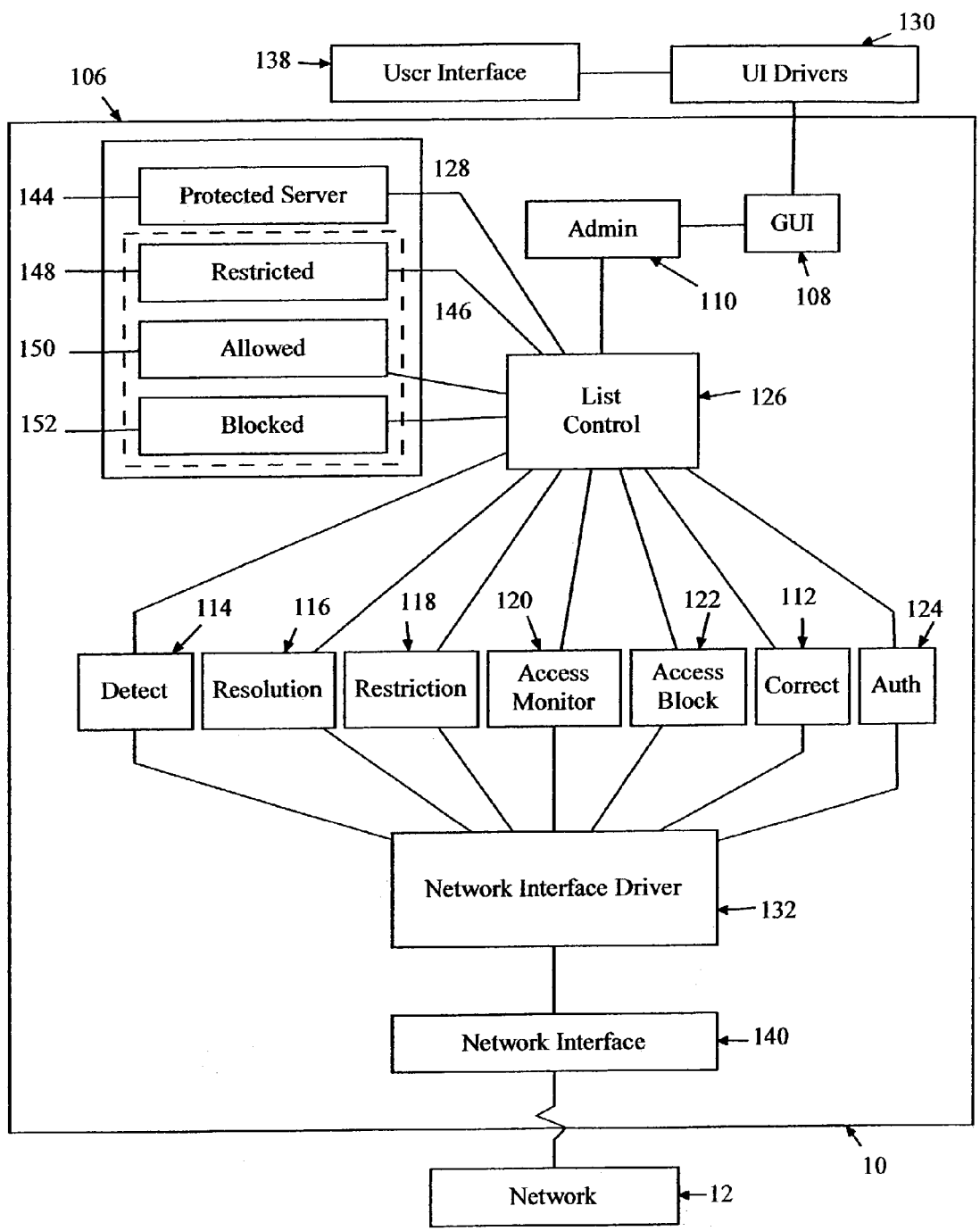
FIG. 8 is a block diagram of the configuration of the security module.

As depicted in FIGS. 8, the routines of security module 106 are configured such that communication with user interface 138 is controlled through GUI 108 and communication with network interface 140 is controlled through network interface driver 132. Management of data structure 128 is controlled by list control 126.

Detection routine 114 monitors "who-has" ARP requests. Resolution routine 116 primarily functions to process ARP requests. Correction routine 112 repetitively generates correction ARP replies 36 to forcibly update client devices 24 on network 12. Administration routine 110 configures TCP/IP settings, protected server list 144, and identity information for authentication server 18. List control 126 controls protected server list 144 and access status lists 146 Access restriction routine 118 generates restriction ARP replies 32 to limit access by restricted client devices 24-R to authentication server 18 until authenticated. Access blocking routine 122 proactively and continually prevents access by a client device 24 if client device 24 fails to authenticate by generating blocking ARP replies 34. Access monitoring routine 120 monitors client devices 24 granted access to determine when the authenticated client device 24 leaves network 12.

Data structure 128 comprises protected server list 144 and access status lists 146, which include restricted client list 148, allowed client list 150 and blocked client list 152. Protected server list 144 is a list of all devices that are protected by security device 10. The configuration of protected server list 144 is shown in FIG. 9.

As shown in FIGS. 10–12, access status lists 146 identify client devices 24 known to security device 10 and the access status of each based upon the list in which a client device 24 is contained. As shown in FIG. 10, each restricted client device 24-R$_{1-j}$ in restricted client list 148 is identified by IP address 158 and MAC address 160. Restricted client MAC address 160 starts with a NULL value 16 when a restricted client device 24-R is first added to restricted client list 148 and until MAC address 160 is determined by address resolution routine 116. As shown in FIG. 11, each allowed client device 24-A$_{1-k}$ in allowed client list 150 is identified by IP address 164 and MAC address 166. As shown in FIG. 12, each blocked client device 24-B$_{1-l}$ in blocked client list 152 is identified by IP address 168 and MAC address 170.

The presence of a client device 24 in restricted client list 148 indicates a "restricted" client device 24-R, in allowed client list 150 indicates an "allowed" client device 24-A, and in blocked client list 152 indicates a "blocked client device 24-B. Restriction routine 118 prevents access by restricted client devices 24-R in restricted client list 148 once the address 160 is added to devices contained in protected server list 144 (i.e., protected servers 16) until restricted client devices 24-R are authenticated by authentication server 18. Access blocking routine 122 blocks access to all network devices by all blocked client devices 24-B in blocked client list 152. Access monitoring routine 120 monitors the network connection of allowed client devices 24-A in allowed client list 150.

Operation

Security device 10 monitors and controls data link layer access by determining the access status of client devices 24 coupled to network 12, and based upon the access status either restricts access to authentication server 18, monitors the network connection or blocks network access. These processes operate continuously and in parallel in order to control the multitude of client devices 24 that continually seek access to, are granted access to, are denied access to, and disconnect from network 12.

Detection routine 114, resolution routine 116, and authentication routine 124 are primarily responsible for determination of the access status of client devices 24. All data frames broadcast on network 12 are visible to network interface 140. Network interface driver 132 operates network interface 140 in "promiscuous" mode so that network interface driver 132 passes all data frames from network interface 140 to detection routine 114 regardless of the target IP and MAC address of the frame.

Detection routine 114 determines if the frame is a "who-has" ARP request. If so, the source IP address of the ARP request is compared to the IP addresses found in access status lists 146 by querying list control 126 for the IP addresses in access status lists 146. If the IP address already exists, this indicates that the client device is known to and actively under control of security device 10. Since the device is known, no further action is required and detection routine 114 discards the ARP request. If the IP address is not in access status lists 146, this indicates that an unknown client device 24 is seeking access to network 12. Detection routine 114 then instructs list control 126 to add the IP address of the unknown client device 24 to restricted client list 148 and set the MAC address in the associated record to NULL 162. Detection routine 114 runs continuously and in parallel to the other routines of security module 106 in order to process all frames that are received by network interface 140.

Resolution routine 116 is called as a thread by list control 126 anytime list control 126 adds a client device 24 to restricted client list 148. Resolution routine 116, once initialized, generates a resolution ARP request 30 for the IP addresses 158 of restricted client devices 24-R and instructs network interface driver 132 to transmit resolution ARP requests 30 onto network 12 via network interface 140.

Once a corresponding ARP reply is received by network interface 140, the corresponding ARP reply (if received) is provided to resolution routine 116 by network interface driver 132. Resolution routine 116 waits 5 meaningful frames to receive the corresponding ARP reply. If the corresponding ARP reply is not received within the designated number of frames, resolution routine 116 instructs list control 126 to move the client device 24 to blocked client list 152. If the resolution is successful, resolution routine 116 instructs list control 126 to update MAC address 160 in restricted client list 148 with the resolved MAC address.

At pre-determined time intervals (preferably every one minute), authentication routine 124 queries list control 126 for client devices 24 in restricted client list 148 and a non-null MAC address value (i.e., the MAC address has been resolved by resolution routine 116). Authentication routine 124 monitors authentication server 18 to determine whether the restricted client IP addresses 158 returned by list control 126 have been authenticated by authentication server 18 (i.e., successfully logged into authentication server 18). An increase in the Last Login variable for the corresponding hostname on authentication server 18 is indicative of successful authentication. A pre-determined grace period as set by the system administrator via administration routine 110 is provided for client devices 24 to successfully login to authentication server 18. If a successful login is detected, authentication routine 124 instructs list control 126 to change the access status of authenticated client devices 24 by moving them to allowed client list 150. If a successful login is not detected, authentication routine 124 instructs list control 126 to change the access status of client devices 24 by moving them to blocked client list 152. Authentication routine 124 operates iteratively at its pre-determined time intervals and in parallel with the other routines of security module 106. By monitoring authentication server 18, authentication routine 124 enables security device 10 to control access to protected servers 16 without the use of dedicated, client-side software at client devices 24.

Restriction routine 118 is called as a thread by list control 126 after every time list control 126 adds a client device 24 to restricted client list 148 in response to detection routine 114 as described above. Restriction routine 118 is a thread that iteratively generates restriction ARP replies 32 for restricted client devices 24-R transmitted at pre-determined intervals (preferably every 2–3 second) via network interface driver 132 onto network 12. Restriction ARP replies 32 are directed to all devices identified in protected server list 144. A restriction ARP reply 34 is not sent to authentication server 18 so that access to protected servers 16 is prevented but access to authentication server 18 is allowed. This enables the client device seeking access to network 12 the opportunity to be authenticated by authentication server 18. A restriction ARP reply 32 is sent to each protected server 16. The thread is stopped by list control 126 once list control removes the restricted client device 24-R from restricted client list 148.

Access monitoring routine 120 queries list control 126 for records in allowed client list 150 at predetermined intervals (preferably every 20 seconds). For every allowed client IP address 164 returned by list control 126, access monitoring routine 120 generates a resolution ARP request 30 and instructs network interface driver to transmit the resolution ARP requests 30 onto network 12. Upon receipt of the corresponding ARP replies via network interface driver 132, access monitoring routine 120 determines whether allowed client devices 24-A at the queried IP addresses respond with the same allowed client MAC address 166 found in allowed client list 150. For every MAC address that is not the same or not received, access monitoring routine 120 instructs list control 126 to delete the record from allowed client list 150. Removal from allowed client list 150 indicates that the client device 24 is no longer on network 12 and logged into authentication server 18. Access monitoring routine 120 runs continuously and in parallel to the other routines of security module 106.

Access blocking routine 122 queries list control 126 for records in blocked client list 152 at predetermined intervals (preferably every 2–3 seconds). For every IP address returned by list control 126, access monitoring routine 120 generates a blocking ARP reply 34 and instructs network interface driver 132 to transmit the blocking ARP replies 34 onto network 12.

After sending a predetermined number of blocking ARP replies 34 (preferably ten) for every blocked client IP address 168 returned by list control 126, access blocking routine 122 generates a resolution ARP request 30 and instructs network interface driver to transmit the resolution ARP requests 30 onto network 12. Upon receipt of the corresponding ARP reply via network interface driver 132, access blocking routine 122 determines whether the client device 24 at the queried IP address responds with the same MAC address as the blocked client MAC address 170 found in blocked client list 152. For every MAC address that is not the same or not received, access blocking routine 122 instructs list control 126 to delete the record from blocked client list 152. Removal from blocked client list 152 indicates that the client device 24 is no longer on network 12. Access blocking routine 122 runs continuously and in parallel to the other routines of security module 106.

Correction routine 112 is an iterative process that runs in parallel to the other routines of security module 106. At pre-determined intervals (preferably, every three seconds), correction routine 112 generates correction ARP replies 36 on behalf of each device in protected server list 144. Thus, ensures that all devices on network 12 always have the correct MAC addresses for protected servers 16 in order to prevent data link layer attacks, such as ARP poisoning and the like. In other words, correction routine 112 acts like a megaphone blasting the true identities of protected servers 16 so that no other device can impersonate a protected server 16. This process directs ARP messages at the devices on network 12 while the other routines principally direct ARP messages at protected devices 16.

Administration routine 110 allows for the system administrator to configure the TCP/IP settings of security device 10, false IP and MAC addresses for use in the ARP messages, operational mode (armed or disarmed) of security device 10 to allow for testing, authentication grace period, IP and MAC addresses in protected server list 144, and IP and MAC address and domain name of authentication server 18. Access to authentication routine 124 is provided through an administrative console presented by GUI 108 to user interface 138 via user interface drivers 130 of operating system 104.

Figure 13:
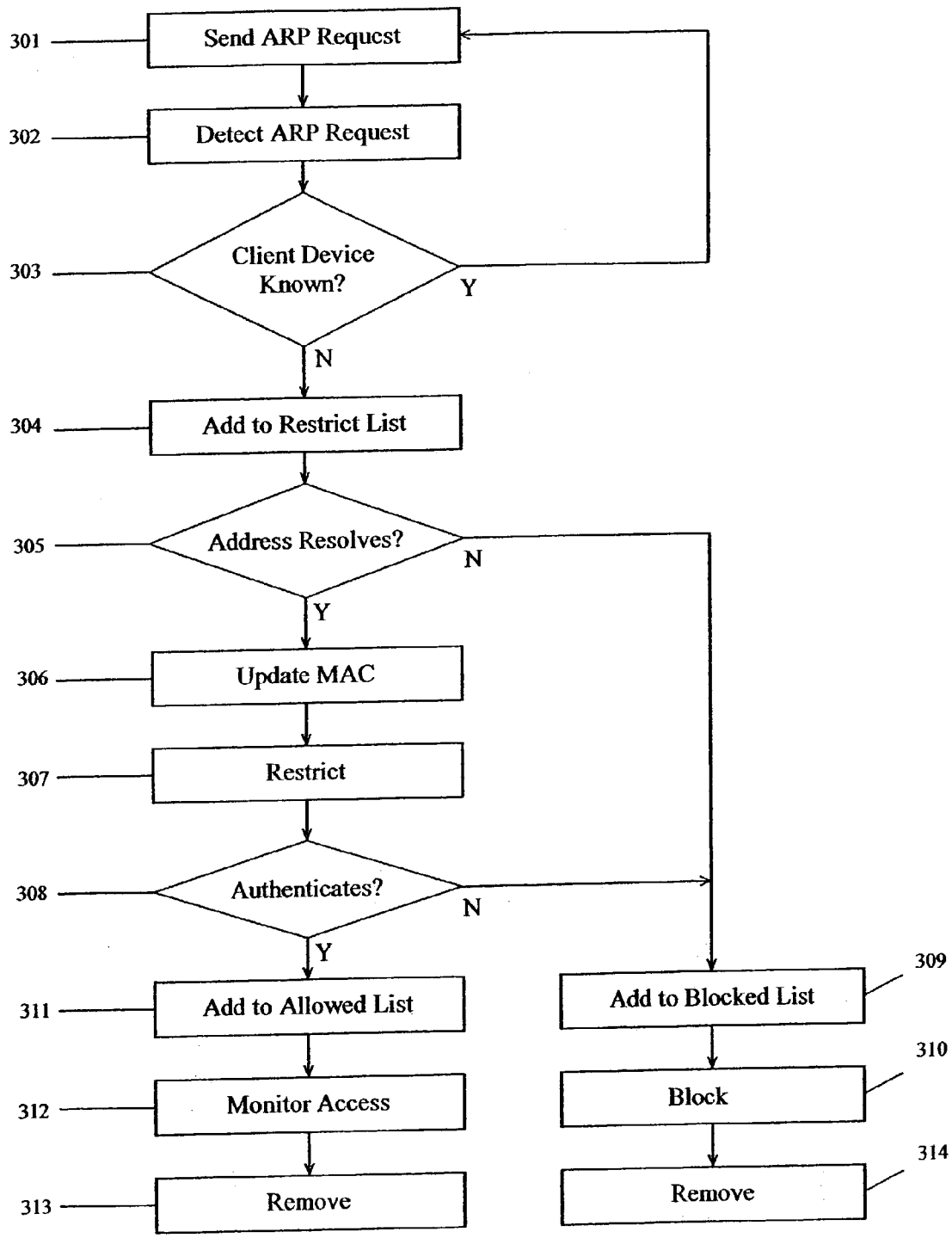
FIG. 13 is a flow chart of the list assignment process for a client device carried out by the security module.
Figure 14:
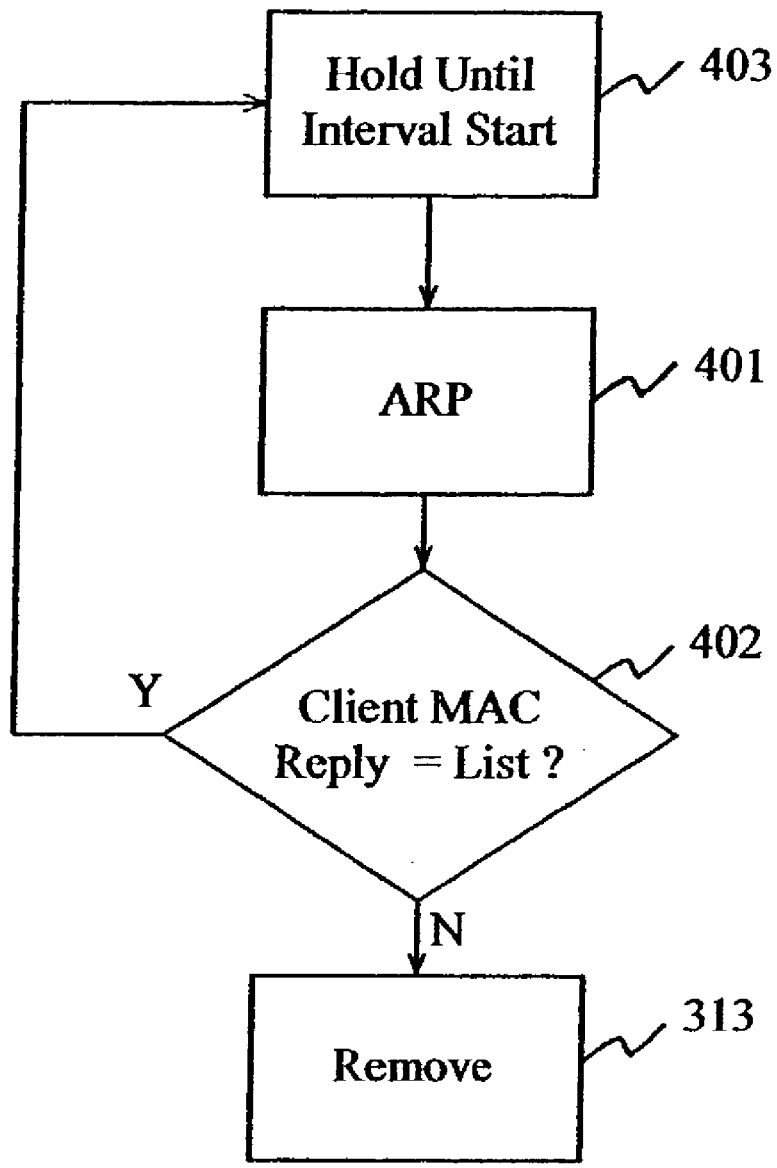
FIG. 14 is a flow chart of the access monitoring process for a client device carried out by the security module.
Figure 15:
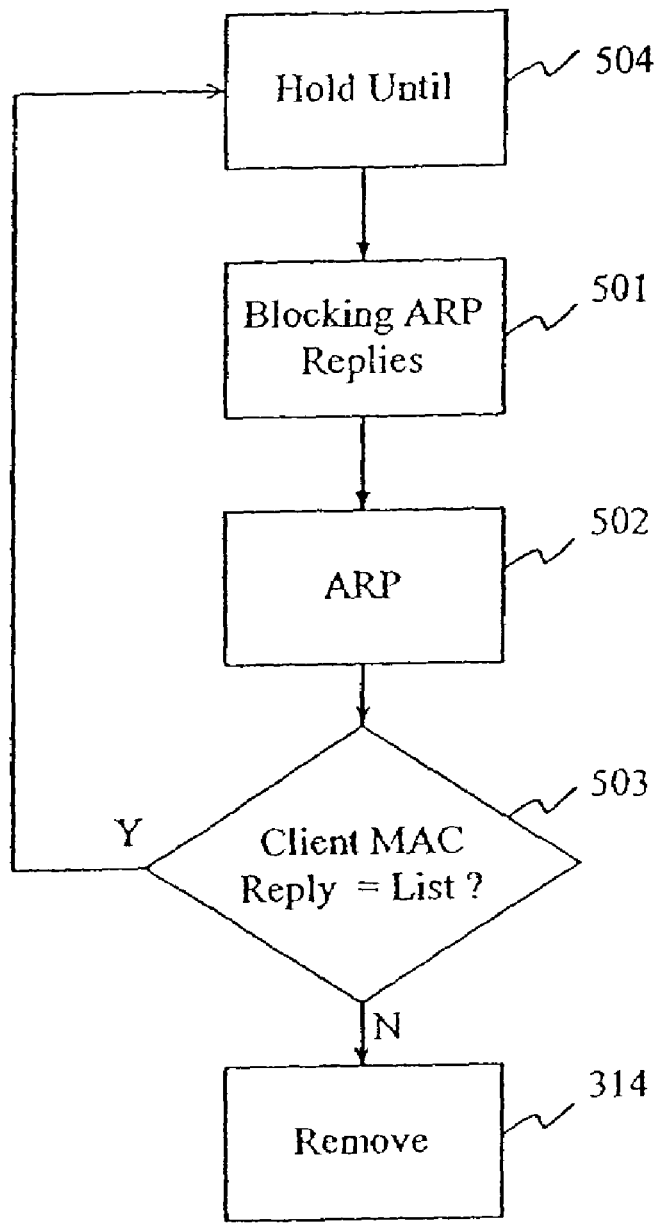
FIG. 15 is a flow chart of the access blocking process for a client device carried out by the security module.

Every client device 24 seeking access to network 12 is treated alike, and thus is monitored and controlled at the data link layer by security device 10. The processing of a given client device 24 seeking access to network 12 is depicted in FIGS. 13–15. The access status discovery process is depicted in FIG. 13. The access monitoring and access blocking of a client device 24 is depicted in FIGS. 14 and 15, respectively.

As shown in FIG. 13, upon seeking access to network 10, a client device 24 generates and transmits an ARP request (step 301). Security device 10 detects the ARP requests (step 302) and then determines whether client device 24 is known (i.e., present in access status lists 146) (step 303). If client device 24 is known, the ARP request is ignored since client device 10 has already established data link layer control. If client device 24 is not known, the IP address of client device 24 is added to restricted client list 148 with NULL 162 as the corresponding restricted client MAC address 160 (step 304).

Then, security device 10 attempts to resolve the MAC address of client device 24 (step 305). If the resolution is successful, the MAC address field 160 in restricted client list 148 is updated with the results of the successful address resolution (step 306). After the resolution update, security device 10 iteratively broadcasts restriction ARP replies 32 that restrict client device 24 to authentication server 18 as long as the client device 24 is in restricted client list 148 (step 307). Client device 24 is restricted to authentication server 18 in order to provide the opportunity for client device 24 to log into authentication server 18. Security device 10 monitors authentication server 18 continuously in order to determine if client device 24 is authenticated within a predetermined time period (step 308).

If client device fails to authenticate in step 308 or resolve in step 305, the client device 24 is moved to blocked client list 152 (step 309). While client device 24 is in blocked, security device 10 sends blocking ARP replies 34 that prevent client device 24 from accessing network devices and disables client device network interface 140 (step 310). The blocking process of step 310 is shown in more detail in FIG. 15.

If client device 24 is authenticated in step 308, the client device 24 is moved to allowed client list 150 (step 311). While client device 24 is allowed, security device 10 allows client device 10 access to protected servers 16 but continuously monitors the access to determine when client device 24 leaves network 12 (step 312). The monitoring process of step 312 is shown in more detail in FIG. 14.

Once client device 24 leaves network 12, whether an authentic or a rogue device, the record corresponding to client device 24 is removed from allowed list 150 (step 313) or blocked client list 152 (step 314). This results in client device 24 being treated as an unknown device the next time access is sought to network 12 and an ARP request is generated in accordance with step 301.

As shown in FIG. 14, if security device 10 determines that the client device 24 is authentic, the access is monitored. Security device 10 generates and transmits a resolution ARP request 30 to the client device 24 at predetermined intervals (step 401) and then determines if the MAC address returned in the ARP reply is the same as the allowed client MAC address 166 contained in allowed client list 150 (step 402). If so, security device 10 waits until the next interval before sending another resolution ARP request 30 in accordance with step 701 (step 403). If not or if a corresponding ARP reply is not received, security device 10 removes client device 24 from allowed client list 150 (step 313).

As shown in FIG. 15, if security device 10 determines that client device is a rogue, the access is blocked. At predetermined intervals, security device 10 generates and transmits a predetermined number of blocking ARP replies 34 that prevent access to protected servers 16 and disable client device 24 (step 501). Once blocking ARP replies 34 are transmitted, security device 10 generates and transmits a resolution ARP request 30 to client device 24 (step 502) and then determines if the MAC address returned in the ARP reply is the same as the MAC address contained in blocked client list 152 (step 503). If so, security device 10 waits until the next interval before sending another series of false ARP replies in accordance with step 801 (step 504). If not or if a corresponding ARP reply is not received, security device 10 removes the client device 24 from blocked client list 152 (step 314).

From the above description, it will be apparent that the invention disclosed herein provides a novel and advantageous apparatus and method for providing security for local area networks. The foregoing discussion discloses and describes merely exemplary methods and embodiments of the present invention. One skilled in the art will readily recognize from such discussion that various changes, modifications and variations may be made therein without departing from the spirit and scope of the invention.

We claim:

1. A method for blocking access to one or more protected devices each having a physical device address and being connected to a computer network by a client device having a physical device address and being connected to the computer network, comprising the steps of:
   (a) receiving address resolution requests broadcast on the network by the client device seeking access to one of the protected devices;
   (b) processing the address resolution requests to determine whether the client device is an unknown device;
   (c) if the client device is unknown as determined in step (b), adding a record identifying the client device in a restricted client list;
   (d) while the client device record is present in the restricted client list, transmitting address resolution replies on the computer network to block access to the protected devices and allow access to an authentication server, and monitoring the authentication server to determine if the client device is authorized or unauthorized by the authentication server;
   (e) if the client device is authorized as determined in step (d), removing the client device record from the restricted client list and adding the client device record to an allowed client list;
   (f) while the client device record is present in the allowed client list, allowing access to the protected devices;
   (g) if the client device is unauthorized as determined in step (d), removing the client device record from the restricted client list and adding the client device record to a blocked client list; and
   (h) while the client device record is present in the blocked client list, transmitting blocking address resolution replies on the computer network to block access to the protected devices.

2. The method recited in claim 1, further comprising the steps of:
   (i) determining when the client device is no longer connected to the computer network; and
   (j) when the client device is no longer connected to the computer network, removing the client device record from the allowed client list if the client device record is in the allowed client list and removing the client device record from the blocked client list if the client device record is in the blocked client list.

3. The method recited in claim 1, wherein the address resolution replies transmitted in step (d) contain a source physical device address corresponding to the physical device address of the client device, an is-at physical device address different than the physical device address of the client device, and a destination physical device address corresponding to the physical device address of one of the protected devices.

4. The method recited in claim 3, wherein the is-at physical device address is pre-determined to not be connected to the computer network.

5. The method recited in claim 1, wherein the blocking address resolution replies contain a source physical device address corresponding to the physical device address of the client device, an is-at physical device address different than the physical device address of the client device, and a destination physical device address corresponding to a broadcast address.

6. The method recited in claim 5, wherein the is-at physical device address is pre-determined to not be connected to the computer network.

7. The method recited in claim 1, further comprising the steps of:
   (i) if the blocking address replies are transmitting in accordance with step (h), transmitting an address resolution request on the computer network destined for the client device;
   (j) if a responsive address resolution reply is received in response to the address resolution request transmitted in step (i), determining whether the responsive address resolution reply contains a source physical device address corresponding to the physical device address of the client device;
   (k) if the source physical device address of the responsive address resolution reply and the physical device address of the client device are the same as determined in step (j), repeating step (i);
   (l) if the source physical device address of the responsive address resolution reply and the physical device address of the client device are different as determined in step (j), ceasing the transmission of the blocking address resolution replies.

8. The method recited in claim 1, further comprising the steps of:
   (i) if access is allowed in accordance with step (f), transmitting an address resolution request on the computer network destined for the client device;
   (j) if a responsive address resolution reply is received in response to the address resolution request transmitted in step (i), determining whether the responsive address resolution reply contains a source physical device address corresponding to the physical device address of the client device;
   (k) if the source physical device address of the responsive address resolution reply and the physical device address of the client device are the same as determined in step (j), repeating step (i);
   (l) if the source physical device address of the responsive address resolution reply and the physical device address of the client device are different as determined in step (j), ceasing allowing the client device access to the protected devices.

9. The method recited in claim 1, further comprising the step of:
   transmitting correction address resolution requests on the computer network to update the client device with the physical device address of the protected devices.

10. The method recited in claim 9, wherein the correction address resolution replies contain an is-at physical device address corresponding to the physical device address of one of the one or more protected devices and a destination physical device address corresponding to a broadcast address.

11. The method recited in claim 1, wherein no dedicated software is required on the client device.

12. The method recited in claim 1, wherein the blocking address resolution replies are configure to disable the client device.

13. An apparatus for blocking access to one or more protected devices each having a physical device address and being connected to a computer network by a client device having a physical device address and being connected to the computer network, the apparatus comprising:

receiving means for receiving address resolution requests broadcast on the network by the client device seeking access to one of the protected devices;

processing means for processing the address resolution requests to determine whether the client device is an unknown device;

first list control means for adding a record identifying the client device in a restricted client list if the client device is unknown as determined by the processing means;

restriction transmitting means for transmitting address resolution replies on the network to block access to the protected devices and allow access to an authentication server while the client device record is present in the restricted client list;

monitoring means for monitoring the authentication server to determine if the client device is authorized or unauthorized by the authentication server;

second list control means for removing the client device record from the restricted client list and adding the client device record to an allowed client list if the client device is authorized as determined by the monitoring means;

allowing means for allowing access to the protected devices while the client device record is present in the allowed client list;

third list control means means for removing the client device record from the restricted client list and adding the client device record to a blocked client list if the client device is unauthorized as determined by the monitoring means; and blocking means for transmitting blocking address resolution replies on the computer network to block access to the protected devices while the client device record is present in the blocked client list.

14. The apparatus recited in claim 13 further comprising:
connection determining means for determining when the client device is no longer connected to the computer network; and fourth list control means for removing the client device record from the allowed client list if the client device record is in the allowed client list when the client device is no longer connected to the computer network; and fifth list control means for removing the client device record from the blocked client list if the client device record is in the blocked client list when the client device is no longer connected to the computer network.

15. The apparatus recited in claim 13, wherein the address resolution replies transmitted while the client device record is present in the restricted client list contain a source physical device address corresponding to the physical device address of the client device, an is-at physical device address different than the physical device address of the client device, and a destination physical device address corresponding to the physical device address of one of the protected devices.

16. The apparatus recited in claim 15, wherein the is-at physical device address is pre-determined to not be connected to the computer network.

17. The apparatus recited in claim 13, wherein the blocking address resolution replies contain a source physical device address corresponding to the physical device address of the client device, an is-at physical device address different than the physical device address of the client device, and a destination physical device address corresponding to a broadcast address.

18. The apparatus recited in claim 17, wherein the is-at physical device address is pre-determined to not be connected to the computer network.

19. The apparatus recited in claim 13 further comprising:
resolution transmitting means for transmitting an address resolution request on the computer network destined for the client device if the blocking address replies are transmitting by the blocking means;

resolution means for determining whether a responsive address resolution reply contains a source physical device address corresponding to the physical device address of the client device if the responsive address resolution reply is received in response to the address resolution request transmitted by the resolution transmitting means;

repeating means for repeating the resolution transmitting means if the source physical device address of the responsive address resolution reply and the physical device address of the client device are the same as determined by the resolution means;

cease-blocking means for ceasing the transmission of the blocking address resolution replies if the source physical device address of the responsive address resolution reply and the physical device address of the client device are different as determined by the resolution means.

20. The apparatus recited in claim 13, further comprising:
resolution transmitting means for transmitting an address resolution request on the computer network destined for the client device if access is allowed by the allowing means;

resolution means for determining whether a responsive address resolution reply contains a source physical device address corresponding to the physical device address of the client device if the responsive address resolution reply is received in response to the address resolution request transmitted by the resolution transmitting means;

repeating means for repeating the resolution transmitting means if the source physical device address of the responsive address resolution reply and the physical device address of the client device are the same as determined by the resolution means;

cease-allowing means for ceasing allowing the client device access to the protected devices if the source physical device address of the responsive address resolution reply and the physical device address of the client device are different as determined by the resolution means.

21. The apparatus recited in claim 13, further comprising:
correction-transmitting means for transmitting correction address resolution requests on the computer network to update the client device with the physical device address of the protected devices.

22. The apparatus recited in claim 21, wherein the correction address resolution replies contain an is-at physical device address corresponding to the physical device address of one of the one or more protected devices and a destination physical device address corresponding to a broadcast address.

23. The apparatus recited in claim 13, wherein no dedicated software is required on the client device.

24. The apparatus recited in claim 13, wherein the blocking address resolution replies are configured to disable the client device.

25. An apparatus for blocking access to one or more protected devices each having a physical device address and being connected to a computer network by a client device having a physical device address and being connected to the computer network, the apparatus comprising:
- a processor;
- a network interface configured to receive address resolution requests broadcast on the network by the client device seeking access to one of the protected devices;
- a detection module configured to process the address resolution requests to determine whether the client device is an unknown device;
- a list control module configured to add a record identifying the client device in a restricted client list if the client device is unknown;
- an access restriction module configured to transmit address resolution replies on the network to block access to the protected devices and allow access to an authentication server while the client device record is present in the restricted client list;
- an authentication monitoring module configured to monitor the authentication server to determine if the client device is authorized or unauthorized by the authentication server, wherein
  - the list control module is further configured to remove the client device record from the restricted client list and to add the client device record to an allowed client list if the client device is authorized by the authentication server,
  - the access restriction module is further configured to allow access to the protected devices while the client device record is present in the allowed client list,
  - the list control module is further configured to remove the client device record from the restricted client list and add the client device record to a blocked client list if the client device is unauthorized by the authentication server; and
- an access blocking module configured to transmit blocking address resolution replies on the computer network to block access to the protected devices while the client device record is present in the blocked client list.

26. The apparatus recited in claim 25 further comprising:
an access monitoring module configured to determine when the client device is no longer connected to the computer network, wherein
  the list control module is further configured to remove the client device record from the allowed client list if the client device record is in the allowed client list when the client device is no longer connected to the computer network, and
  the list control module is further configured to remove the client device record from the blocked client list if the client device record is in the blocked client list when the client device is no longer connected to the computer network.

27. The apparatus recited in claim 25, wherein the address resolution replies transmitted while the client device record is present in the restricted client list contain a source physical device address corresponding to the physical device address of the client device, an is-at physical device address different than the physical device address of the client device, and a destination physical device address corresponding to the physical device address of one of the protected devices.

28. The apparatus recited in claim 27, wherein the is-at physical device address is pre-determined to not be connected to the computer network.

29. The apparatus recited in claim 25, wherein the blocking address resolution replies contain a source physical device address corresponding to the physical device address of the client device, an is-at physical device address different than the physical device address of the client device, and a destination physical device address corresponding to a broadcast address.

30. The apparatus recited in claim 29, wherein the is-at physical device address is pre-determined to not be connected to the computer network.

31. The apparatus recited in claim 25 further comprising:
a resolution module configured to transmit an address resolution request on the computer network destined for the client device if the blocking address replies are transmitting by the access blocking module, wherein
  the resolution module is further configured to determine whether a responsive address resolution reply contains a source physical device address corresponding to the physical device address of the client device if the responsive address resolution reply is received in response to the address resolution request,
  the resolution module is further configured to cause the transmitting of the address resolution request to be repeated if the source physical device address of the responsive address resolution reply and the physical device address of the client device are the same, and
  the resolution module is further configured to cause the transmission of the blocking address resolution replies to cease if the source physical device address of the responsive address resolution reply and the physical device address of the client device are different.

32. The apparatus recited in claim 25, further comprising:
a resolution module configured to transmit an address resolution request on the computer network destined for the client device if access is allowed by the allowing module, wherein
  the resolution module is further configured to determine whether a responsive address resolution reply contains a source physical device address corresponding to the physical device address of the client device if the responsive address resolution reply is received in response to the address resolution request transmitted by the blocking module,
  the resolution module is further configured to cause the transmitting of the address resolution to be repeated if the source physical device address of the responsive address resolution reply and the physical device address of the client device are the same, and
  the resolution module is further configured to cause allowing the client device access to the protected devices to cease if the source physical device address of the responsive address resolution reply and the physical device address of the client device are different.

33. The apparatus recited in claim 25, further comprising:
a correction module configured to transmit correction address resolution requests on the computer network to update the client device with the physical device address of the protected devices.

34. The apparatus recited in claim 33, wherein the correction address resolution replies contain an is-at physical device address corresponding to the physical device address of one of the one or more protected devices and a destination physical device address corresponding to a broadcast address.

35. The apparatus recited in claim 25, wherein no dedicated software is required on the client device.

36. The apparatus recited in claim 25, wherein the blocking address resolution replies are configured to disable the client device.

* * * * *